United States Patent
Apte et al.

(10) Patent No.: US 7,225,142 B1
(45) Date of Patent: May 29, 2007

(54) INTERACTIVE MULTIMEDIA ADVERTISING AND ELECTRONIC COMMERCE ON A HYPERTEXT NETWORK

(75) Inventors: Jitendra Apte, Woodbridge; Marina Lima Roesler, Westfield, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/691,900

(22) Filed: Aug. 1, 1996

(51) Int. Cl.
  *G07G 1/00* (2006.01)

(52) U.S. Cl. .............................. 705/14; 705/26; 705/27
(58) Field of Classification Search .................. 705/14, 705/26, 27; 395/200.47, 200.48; 380/24, 380/30, 25; 709/217, 224
See application file for complete search history.

(56) References Cited

U.S. PATENT DOCUMENTS

| | | | |
|---|---|---|---|
| 4,799,156 A | * | 1/1989 | Shavit et al. .................. 705/26 |
| 4,949,256 A | | 8/1990 | Pirani et al. |
| 5,105,184 A | * | 4/1992 | Pirani et al. ................ 345/115 |
| 5,285,278 A | | 2/1994 | Holman |
| 5,305,195 A | * | 4/1994 | Murphy ........................ 705/14 |
| 5,353,218 A | * | 10/1994 | De Lapa et al. ............... 705/14 |
| 5,544,040 A | * | 8/1996 | Gerbaulet .................... 705/26 |
| 5,557,721 A | * | 9/1996 | Fite et al. .................... 395/148 |
| 5,696,965 A | * | 12/1997 | Dedrick ........................ 705/10 |
| 5,708,780 A | * | 1/1998 | Levergood et al. .... 395/200.59 |
| 5,715,314 A | * | 2/1998 | Payne et al. .................. 380/24 |
| 5,724,424 A | * | 3/1998 | Gifford ........................ 380/24 |
| 5,727,156 A | * | 3/1998 | Herr-Hoyman et al. ...................... 395/200.49 |

(Continued)

FOREIGN PATENT DOCUMENTS

| | | |
|---|---|---|
| EP | 0 822 535 | 2/1998 |
| WO | WO 95/12176 | 5/1995 |
| WO | WO 95/16971 | 6/1995 |
| WO | WO 97/12486 | 4/1997 |

OTHER PUBLICATIONS

Donald T. Hawkins, "Electronic Advertising on Online Information System", Online v. 18, n 2, pp. 26–39.
Schlender "Whose Internet is it, anyway"; Dec. 1995; Fortune V132n12 pp. 120–142, European 66–73; Dialof file 15, Accession No. 01125649.*
"I/Pro Is First Develop A Solution For Measuring Java Applets", Apr. 1996; PR Newswire, p412SFF008; Dialog file 16, Accession No. 04298692.*
Nicol, D., et al., "Footsteps: Trail–Blazing the Web", Computer Networks & ISDN Systems, vol. 27, No. 6, Apr. 1, 1995, pp. 879–885.
Goldstein, J, et al., "Uses of Interactive Multimedia for Advertising, Marketing, & Sales", Multimedia Review, Summer 1993, vol. 4, No. 2, pp. 60–64.
European Patent Office Extended Search Report for Corresponding European Patent Application No. 06003510.2–2214.

(Continued)

*Primary Examiner*—Romain Jeanty

(57) ABSTRACT

A system and method for providing targeted, interactive, multimedia advertisements and electronic commerce capability on a hypertext network. Advertising software from a server is loaded on a user's client computer through a browser at the user's request. The display screen of the client computer is partitioned into a browser area, which retains the full functionality of the underlying browser, and advertising area. Controls affecting the presentation and content of the advertisements streamed from the server to the client computer are available to the user in the advertising area, as are secure purchase and electronic coupon controls.

44 Claims, 11 Drawing Sheets

U.S. PATENT DOCUMENTS

| | | | | |
|---|---|---|---|---|
| 5,737,619 A | * | 4/1998 | Judson | 707/500 |
| 5,740,361 A | * | 4/1998 | Brown | 395/187.01 |
| 5,740,549 A | * | 4/1998 | Reilly et al. | 705/14 |
| 5,754,939 A | * | 5/1998 | Hertz et al. | 455/4.2 |
| 5,761,683 A | * | 6/1998 | Logan et al. | 707/513 |
| 5,805,242 A | * | 9/1998 | Shaw et al. | 705/14 |
| 5,848,396 A | * | 12/1998 | Gerace | 705/10 |
| 5,909,670 A | | 6/1999 | Trader et al. | 705/14 |
| 5,937,390 A | * | 8/1999 | Hyodo | 705/14 |
| 5,957,695 A | * | 9/1999 | Redford et al. | 434/307 R |
| 5,959,623 A | * | 9/1999 | van Hoff et al. | 345/719 |
| 5,970,469 A | * | 10/1999 | Scroggie et al. | 705/14 |
| 6,185,541 B1 | | 2/2001 | Scroggie et al. | 705/14 |
| 6,199,106 B1 | * | 3/2001 | Shaw et al. | 709/217 |
| 6,336,099 B1 | * | 1/2002 | Barnett et al. | 705/14 |
| 6,356,874 B1 | * | 3/2002 | .O slashed.hrn | 705/6 |
| 6,457,025 B2 | * | 9/2002 | Judson | 715/501.1 |
| 6,483,895 B2 | * | 11/2002 | Bixler et al. | 379/67.1 |

OTHER PUBLICATIONS

Y. Kohda, et al., "Ubiquitous Advertising on the WWW: Merging Advertisement on the Browser", Computer Networks and ISDN Systems, vol. 28, pp. 1493–1499, 1996.

Wiedling, H. P, "HotJava –EIN WWW–Browser für Nachladbare Objekte", Objekt Verlag, Duesseldorf, DE, No. 5, pp. 68–69, 1995.

Nicol, D., et al., "Footsteps: Trail–Blazing the Web", Computer Networks & ISDN Systems, vol. 27, No. 6, Apr. 1, 1995, pp. 879–885.

Goldstein, J, et al., "Uses of Interactive Multimedia for Advertising, Marketing, & Sales", Multimedia Review, Summer 1993, vol. 4, No. 2, pp. 60–64.

* cited by examiner

INTERACTIVE MULTIMEDIA ADVERTISING AND ELECTRONIC COMMERCE ON A HYPERTEXT NETWORK

FIELD OF THE INVENTION

This invention relates to providing interactive advertising and secure purchase opportunities on a network, and particularly to a system and method for providing targeted, interactive, multimedia advertising and electronic commerce capabilities through a hypertext network.

BACKGROUND OF THE INVENTION

A hypertext file is displayed on a computer as a page through software called a browser. A page comprises links that, when selected by a user, cause another page to be displayed (known as the linked page), cause another part of the presently displayed page to be shown, or else cause a computer program to execute. A hypertext file is written in a programming language such as Hypertext Markup Language (HTML).

A logical grouping of hypertext files is called a site. Sites may reside on different computers. A set of sites that are interconnected by links is called a web. A site on a first computer may be effectively linked to a site on a second computer by connecting the first and second computers through a network. An example of a set of sites residing on different computers interconnected by a network is the World Wide Web (WWW), which is a set of sites written in HTML on computers interconnected by the Internet. Each site on the WWW is known as a website.

A site resides on a computer known as a server, which is accessed through a network by a user utilizing a client computer. Pages at a site are viewed by the user through software called a browser, which resides on the user's client computer. Here, a client computer is a system with a microprocessor and means for storing data and/or software such as random access memory and/or a hard disk drive, and which is capable of communicating with a hypertext network. The client computer is capable of providing output for display to a user, for example through a video display. Such output may take the form of at least one of textual, graphic, animation, video, audio, or virtual object media. The client computer is also capable of accepting input from a user. Such input may be provided by means such as a keyboard, a mouse, a telephone touch pad, a television remote control, and so on.

A web can be used as a channel for disseminating commercial information, including advertisements, as well as effectuating electronic commerce. Electronic commerce here refers to the process of buying and selling on a web.

Advertising on a web may be static or dynamic. Static web advertising operates by displaying an advertisement image at a fixed location on a page displayed to a user. The advertisement image may be a link that, when selected by the user, displays a new page that conveys additional information about the product or service featured in the static advertisement. The advertisement image link generally disappears when selected, and is replaced on the screen by the linked page.

Dynamic web advertising operates by displaying a sequence of advertisements. Dynamic web advertising is implemented using proprietary, stand-alone advertiser software that must be downloaded to the user client and executed by the user. Stand-alone here means software that operates independently of any other application software. Like the static advertisement, the dynamic advertisement may also be a link, is displayed at a fixed location on a page, and generally disappears after it is selected and replaced by a linked page.

An example of a dynamic web advertising system is the Point Cast Network. FIG. 1 shows this known stand-alone system that is installed as an independent software package on the client computer. Information including news, weather and sports is transmitted to the PCN software on the client computer and is updated periodically. The user may view news stories by selecting the news button 11, the weather by selecting the weather button 12, and so on. Advertisements are shown in a corner of the screen, in the advertisement area 13.

Each advertisement 14 is a link. When the user selects an advertisement link, PCN launches a browser and loads and displays a page 21 (FIG. 2) at a predetermined address, known as a Universal Resource Locator (URL) 22. The browser replaces the advertisement area 13, so PCN no longer displays advertisements to the user. Alternatively, PCN may be configured to launch a separate stand-alone browser, such as the Netscape browser, when an advertisement link is selected. In this case, the stand-alone browser appears in front of and obscures the advertisements presented by PCN. However, the browser can be moved to another part of the screen, thus revealing the ongoing stream of advertisements from PCN.

Nonetheless, viewing both PCN and the page on the stand-alone browser in their entirety is practically impossible, and the user generally must choose whether to view the one or the other, but cannot typically view both.

The advertisements that appear on the PCN comprise graphic and animated media. The advertisements are downloaded from a server to a client computer and occasionally updated (along with the rest of the content on the PCN) when the user selects the update button 15 (FIG. 1). A set of advertisements are stored on the user's client computer and played in sequence in a loop. The sequence repeats with a duty cycle dependent upon the number of advertisements downloaded.

In another known advertising system called the Hypernet, advertisements are streamed to the user while permitting the user to continue to browse the Internet. When an advertisement is selected, a page is presented to the user.

For these known systems, each advertisement only appears for a short period of time, and then is replaced by the next advertisement in the sequence. The user has no control over the content or order of the advertisements, and cannot pause, skip, replay, or step through the advertisements at will. Nor can the user make a secure purchase directly using the PCN service. The same advertisements are sent to all users, regardless of user preferences.

Both static and dynamic advertisements are limited in that they only provide a one-way flow of information from the advertiser to the user. At best, these advertisements provide a telephone number that the user must call to purchase or learn more about the advertised product, or a link to a page with additional information from the advertiser. Additional information from the advertiser must be requested through the advertiser's page that is linked to the advertisement, or verbally over the telephone from an advertiser representative.

Another disadvantage of known advertising systems is that, when an advertisement is selected by a user, the advertising process is generally interrupted as the linked page is displayed to the user. In systems where the advertising process is not interrupted, it is difficult or impossible for the user to view both advertisements and the linked page in their entirety. Thus, other advertisers are essentially prevented from presenting their advertisements while the user is pursuing further information on another advertisement.

Furthermore, a linked page generally contains other enticing links, thus reducing the likelihood that the user will soon (if ever) return to the website on which the advertisements are displayed.

A superior system of advertising on a web would provide the user with the capability to interact with and control the presentation of advertisements; engage in electronic commerce without leaving the web; easily obtain additional information regarding a product or service featured in an advertisement without interrupting the display of further advertisements; and establish communications with a sales representative of the advertiser through the client computer without leaving the web.

These features would enable an advertiser to more effectively target a purchaser, sending advertisements that are responsive to the user's needs. They would also give the user access to extensive information about the advertised product or service, resulting in better, more informed buying decisions. Advertisers would be able to take advantage of the low cost of selling electronically, thus lowering their cost of sales and improving their profitability. Competition under these circumstances would result in lower prices and greater values for the purchaser.

SUMMARY OF THE INVENTION

The present invention provides a system and method for advertising and carrying out electronic commerce on a web using advertising software that is transmitted from a server to a client computer over a network at a user's request. The advertising software operates as an overlay to a conventional, known browser, such as the Netscape browser, dividing the user's client computer display into an advertising area and a browser area.

The advertising area is provided with buttons for the user to control the presentation and content of advertisements, and for the user to view multimedia information, securely purchase an item, clip an electronic coupon, and communicate with a sales agent concerning a presently displayed advertisement.

The user may pause the stream of advertisements, view a previously displayed advertisement, or skip forward to the next advertisement to be displayed.

The browser area retains the original functionality of the underlying browser and operates independently of the advertising area, except that certain buttons (e.g., control buttons and electronic transaction buttons) in the advertising area cause pages to load and display in the browser area when selected. The independent operation of the browser area means that several advertisements may be displayed to a user in the advertising area while the user browses a single page in the browser area. This is superior to known systems wherein only one fixed advertisement may be shown on each browsed page.

The server includes a home page by which the advertising service may be accessed by the user. The server also includes a help page by which assistance in using the advertising service may be provided to the user.

In accordance with the present invention, the advertising server streams advertisements in sequence to the client computer more or less continuously. This is in contrast to known advertising services, which download a set of advertisements to a client computer that are stored and shown in a repeating loop to the user.

Also in accordance with the present invention, the advertisements shown to the user are interactive multimedia advertisements, comprising one or more of text, graphics, animation, video, audio, and virtual object media that include at least one link to a page that is displayed in the browser area when selected. The multimedia features of the advertisements of the present invention are advantageous because they stimulate users to buy who are especially responsive to video, virtual object browsing, audio, animation, text, graphics, or any combination thereof, whereas known advertising systems only appeal to those who are receptive to text, graphics, animation, and combinations thereof.

A user may select advertising topics, whereupon advertisements in the selected topics are transmitted to the user. Advertisements may also be selected by deducing user areas of interest based upon the content of pages on the web selected by the user for viewing.

The present invention provides a superior system and method for providing targeted, interactive, multimedia advertising and electronic commerce capabilities by which advertisers and users may exchange information and buy and sell goods and services.

DETAILED DESCRIPTION

The present invention provides a new and superior system and method for providing advertising and electronic commerce capabilities on a web.

In accordance with the present invention, the content and presentation of advertisements may be controlled by the user, who may also securely purchase goods and services without having to leave the web.

The present invention is interactive, providing means for sending information from the user to the advertiser, as well as vice versa. This results in more targeted advertising and better, more pertinent information being sent to the prospective purchaser.

Figure 1:
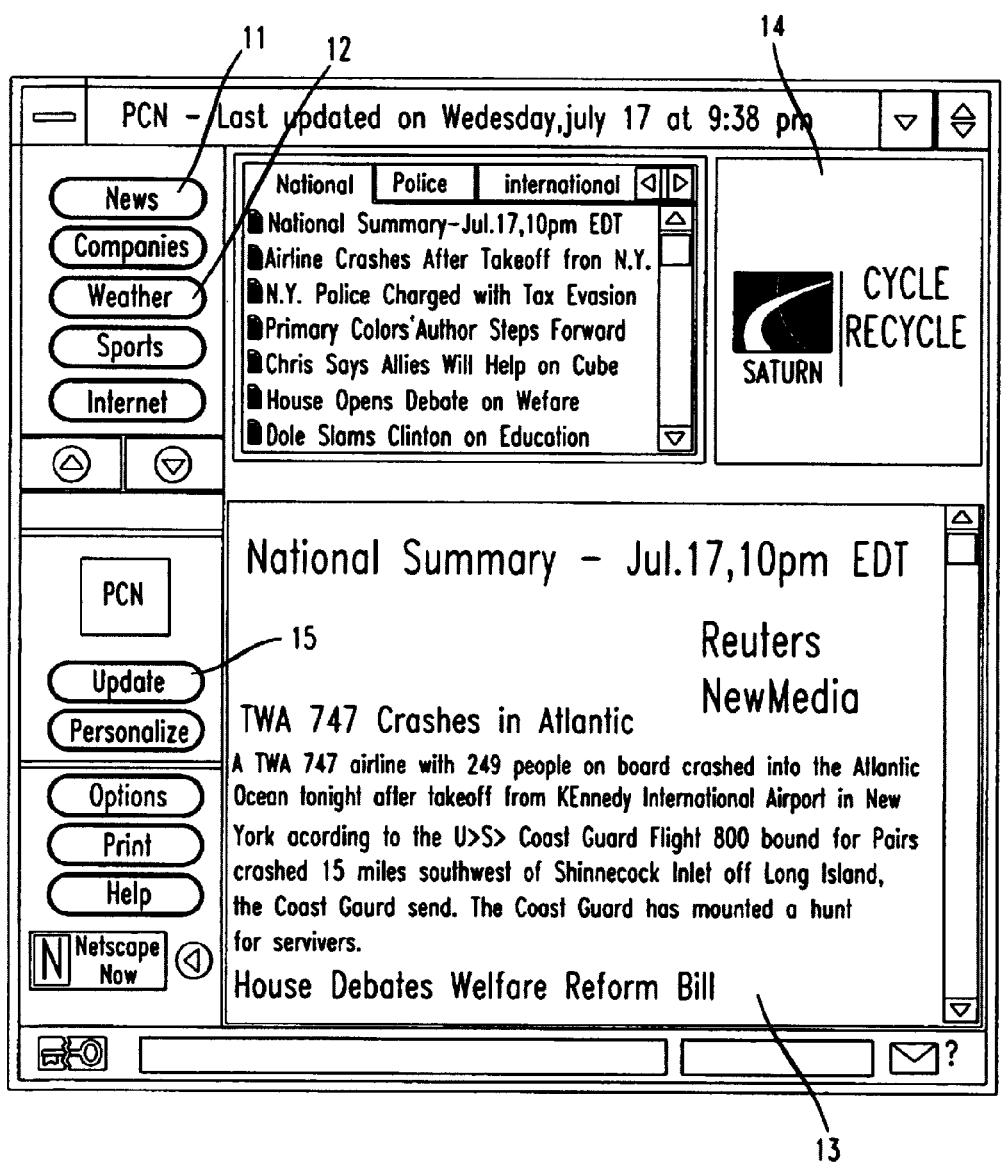
FIG. 1 shows a known advertising service for a web.
Figure 2:
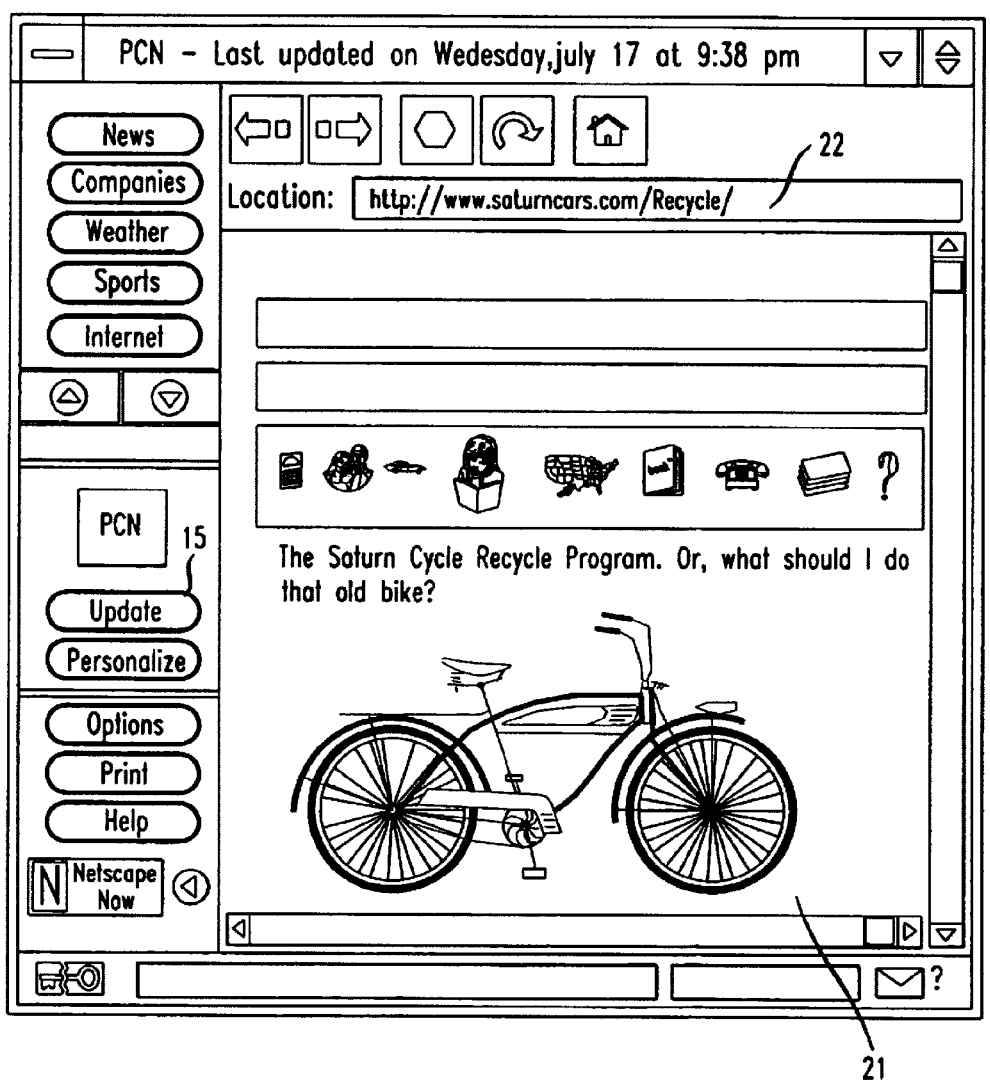
FIG. 2 shows another a known advertising service for a web displaying a page linked to an advertisement.
Figure 3:
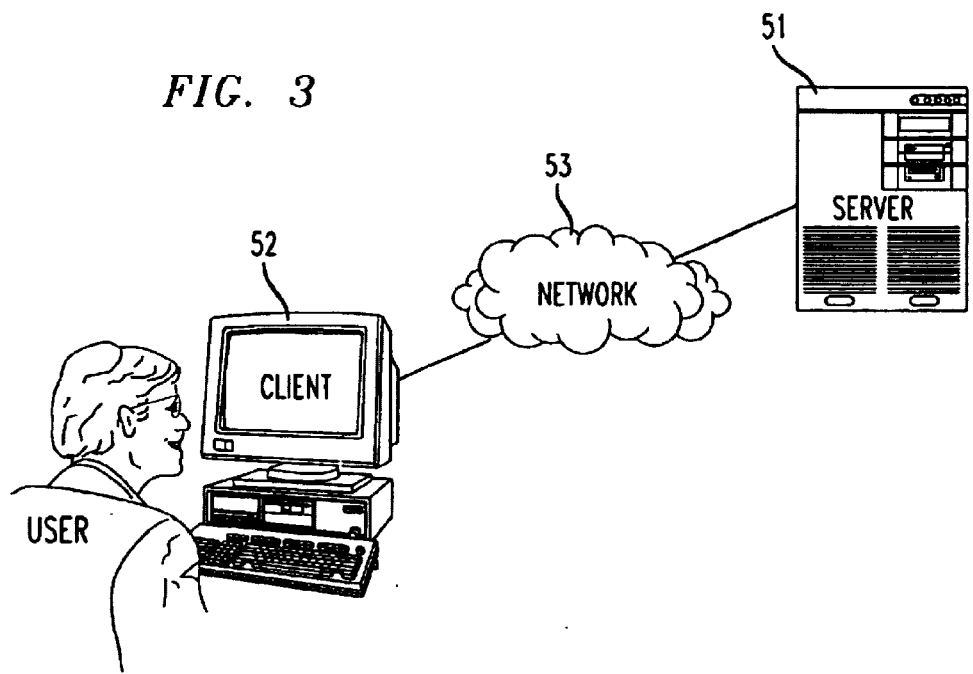
FIG. 3 shows an embodiment of the present invention.

The system of the present invention, shown in FIG. 3, comprises a server 51 and client computer 52 that has a browser, with the server 51 and client computer 52 interconnected through a network 53. The client computer 52 comprises a microprocessor, a display device such as a screen, storage devices such as a hard disk drive and random access memory, and input devices such as a keyboard and mouse.

Figure 3A:
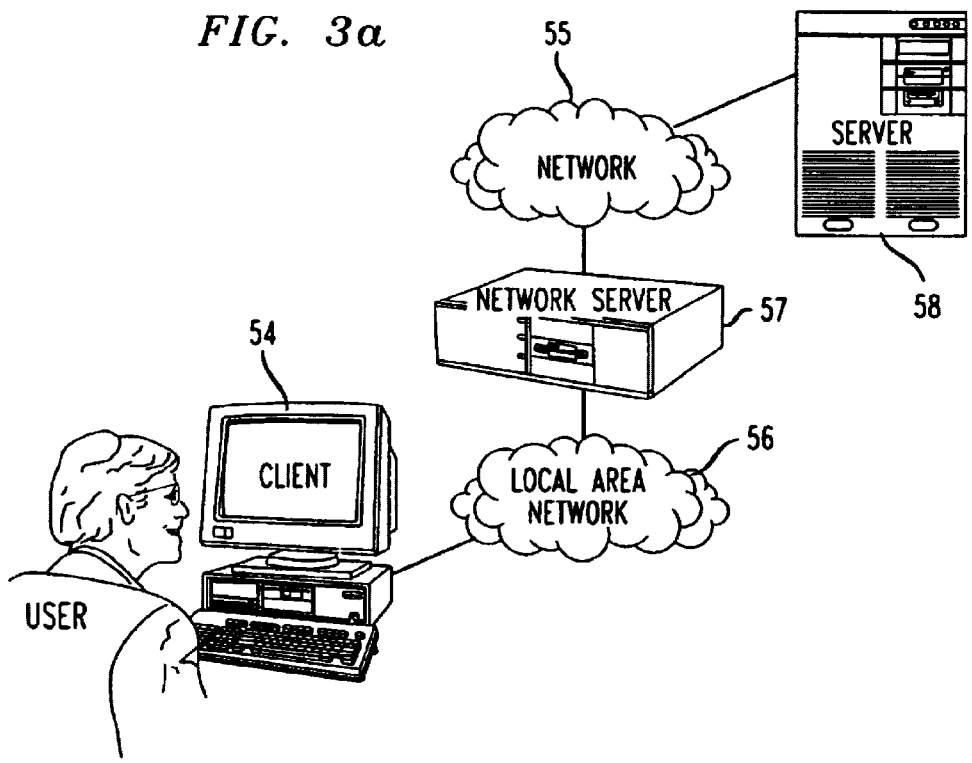

Advertising software on the server 51 is downloaded to the client computer 52 and executes to act as an overlay to the browser. In one embodiment, this software is written in the Java programming language, and is loaded and executed on the client computer 52 when a user selects an advertising service link on an advertising service page displayed to the user through the user's browser. This mode of operation is superior to known advertising systems that execute exclusively outside of the client computer 52, because the system of the present invention is able to obtain information regarding the client computer 52 that may be screened by a firewall between the client computer 52 and the server 51. For example, the present system is able to obtain the exact network address of client computer 54 (FIG. 3a) that is connected to the network 55 through a local area network 56, whereas known systems would only be able to determine the network address of the network server 57 on the local area network.

While the advertising software executes on the client computer 52 (FIG. 3), the browser retains its initial functionality to browse hypertext files, and the advertising software appropriates a part of the display screen of the client computer 52.

Figure 4:
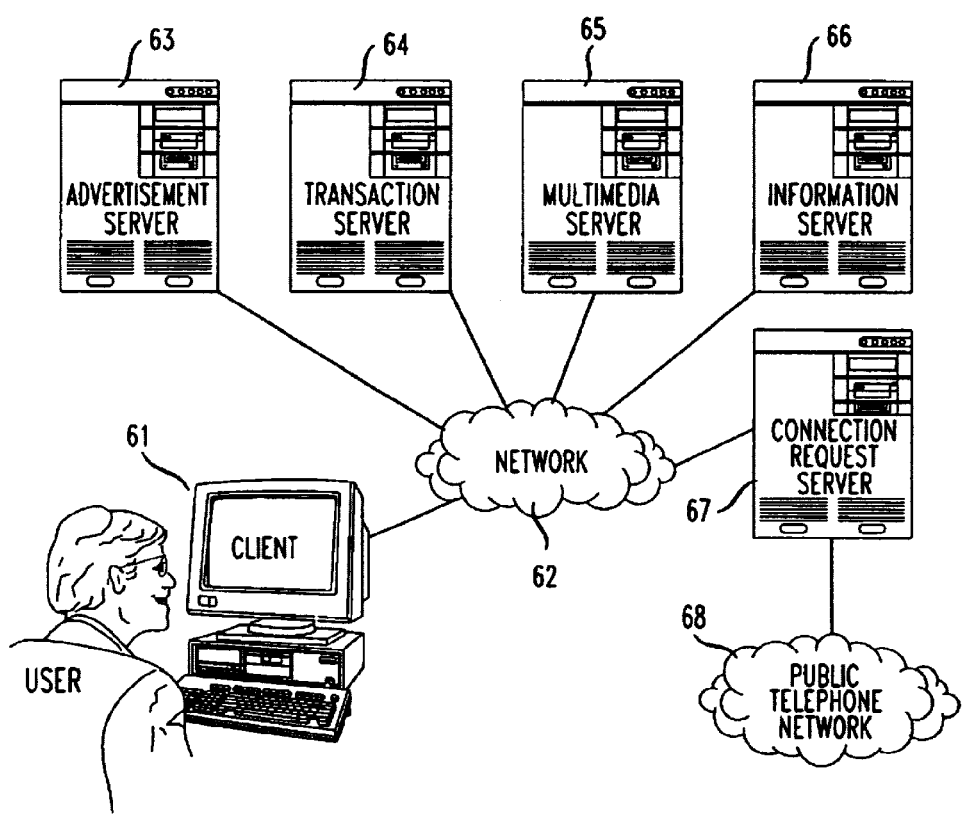
FIG. 4 shows a system in accordance with an embodiment of the present invention.

In another embodiment of the present invention shown in FIG. 4, the functions of the advertising service provider in accordance with the present invention are divided among several servers interconnected with each other and the client computer 61 through a network 62. Advertisements are streamed to the client computer from an advertisement server 63. Secure purchase transactions are handled by a transaction server 64. Multimedia information is transmitted to the client computer from a multimedia server 65. Assistance is provided to users from an information server 66. Communications are established between a user and an advertiser using a connection request server 67, which is connected to a public telephone network 68. In one embodiment, communications are established using the invention disclosed in U.S. patent application Ser. No. 09/038,149, filed Mar. 11, 1998, which is incorporated herein by reference.

Figure 5:
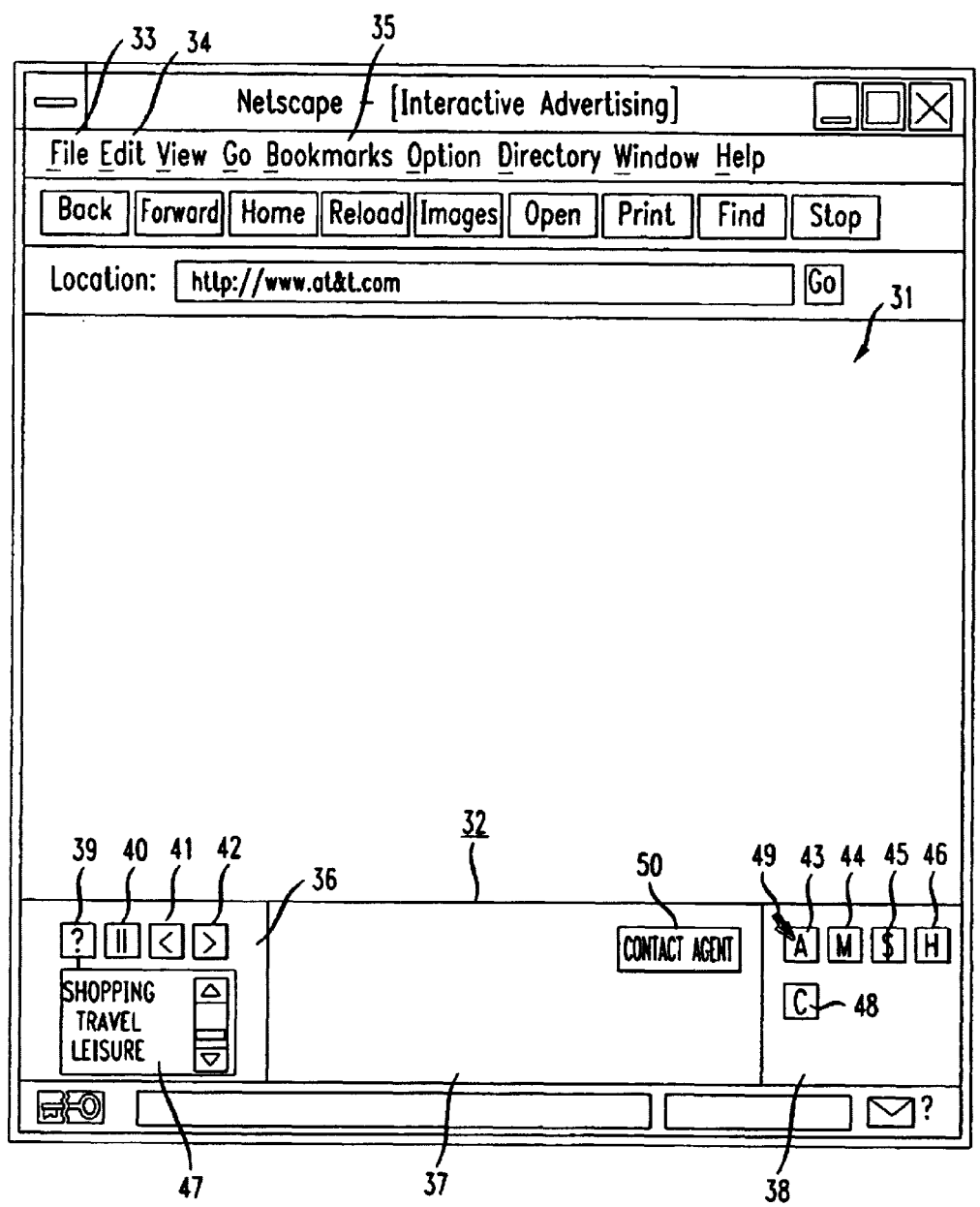
FIG. 5 shows a graphical user interface in accordance with an embodiment of the present invention.

The advertiser software acts with the browser to present to the user a display, an embodiment of which is shown in FIG. 5. The user's screen is divided into two areas: the browser area 31 and the advertisement area 32. The browser area and the advertising area operate essentially independently so that several advertisements may advantageously be displayed to the user while the user is browsing a single page displayed in the browser area.

The browser area 31 retains all of the controls originally provided by the browser, including the file features 33, the edit feature 34, the bookmarks feature 35, and so on. Thus, the browser area continues to function essentially as the original browser (before the advertising software was downloaded and executed). In this embodiment, the area for viewing pages 31 has been decreased to accommodate the advertiser area 32.

The advertisement area 32 comprises a control area 36, a display area 37, and a transaction area 38. The control area is provided with a help button 39, a pause button 40, a step back button 41, and a step forward button 42. Each button acts as a link. In one embodiment, when the user places the mouse arrow 49 over a button, an explanatory bubble 50 appears nearby that comprises a short description of the functionality of the button.

When selected by a user, the help button 39 loads and displays an advertising service help page in the browser area 31. In one embodiment, the help page has a table of contents, a searchable index, and general information about using the present invention. The table of contents and index comprise links to other help pages that provide detailed information on specific topics of interest concerning the advertising service to the user.

The pause button 40 halts the progression of the advertisements shown in the display area 37, which are streamed to the client computer in sequence from a server. The advertisement shown in the display area 37 at the time the user selected the pause button 40 persists in the display area 37 until the user again selects the pause button 40, at which time the next advertisement is shown in the display area 37, and the progression is resumed. In this way, the pause button functions as a toggle.

A predetermined number of advertisements shown in the display area are cached on the client computer. The present invention provides the capability of stepping back to previously displayed advertisements by selecting the step back button 41. When this button is selected, the progression of advertisements shown in the display area 37 is suspended, and the user may review previously displayed advertisements one at a time. The progression may be resumed at any time by selecting the pause button 40.

In order to move forward through advertisements, the present invention provides the step forward button 42. When selected, the step forward button causes the next advertisement in the progression to be displayed in the display area 37. Thus, if the step forward button 42 is selected while reviewing previously shown advertisements, the next previously shown advertisement will be displayed in the display area 37. In this way, it is possible to move forward among previously displayed advertisements.

Likewise, if the step forward button 42 is selected during the progression of streamed advertisements from the server, the presently displayed advertisement will be immediately replaced with the next advertisement in the progression.

The pause button 40, the step backward button 41, and the step forward button 42 provide the capability of suspending the progression of advertisements, moving backwards and forward among previously displayed advertisements, and immediately replacing a presently displayed advertisement with the next advertisement in the progression.

The advertisements shown in the display area 37 may be links, may contain links, and/or may function as image maps with selectable areas. Image maps are known in the art. The advertisements comprise at least one of textual, graphic, animation, video, audio and virtual object media.

Because the advertisements are streamed from a server rather than downloaded as a set and played to the user in a loop, the present invention can make choices about which advertisements to display to the user that are responsive to the user's current viewing habits. Thus, if a user is selecting and viewing pages in the browser area 31 concerning outdoor activities, the present invention can select advertisements for camping gear, which are streamed from the server to the client for display to the user. This advantageous capability to dynamically target advertisements is not provided by known advertising services that download predetermined advertisements in sets.

This dynamic targeting capability is in part due to the capability of the present invention to operate with a browser such that the progression of advertisements in no way interferes with the independent operation of the browser.

Figure 6:
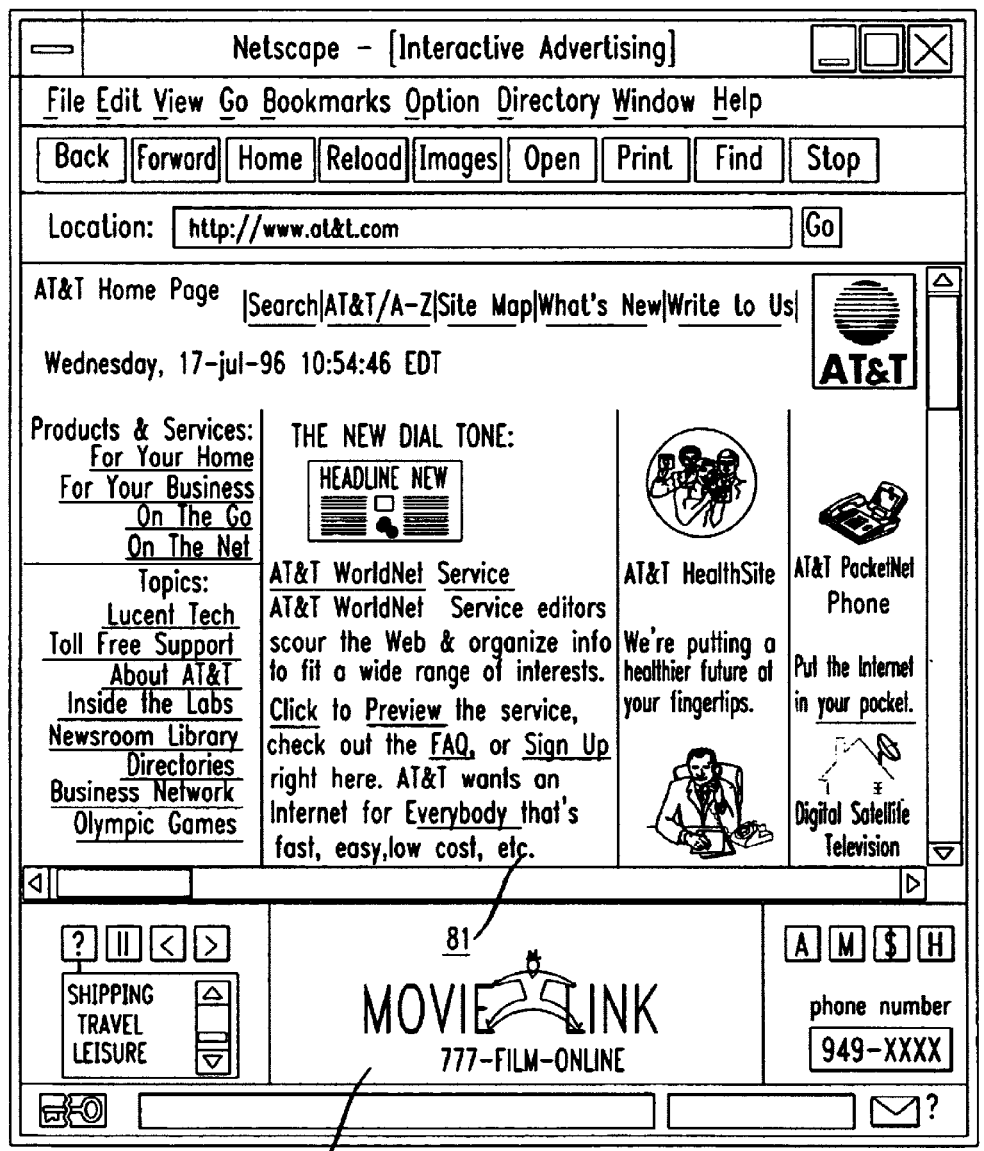
FIG. 6 shows another graphic user interface in accordance with an embodiment of the present invention.

An embodiment of the present invention as an overlay to the known Netscape browser is shown in FIG. 6. The browser area 81 maintains all of the functionality of the Netscape browser, while the advertising area 82 comprises the features shown in FIG. 5.

The transaction area 38 is provided with a sales agent button 43, a media clip button 44, a secure purchase button 45, a home page button 46, and an electronic coupon button 48.

When selected by a user, the sales agent button 43 establishes communications between the user and a sales agent for the sponsor of the advertisement presently shown in the display area 37. In one embodiment, a connection request is forwarded to a connection server, and a telephone call is established in accordance with the invention disclosed in U.S. patent application Ser. No. 09/038,149, filed Mar. 11, 1998, which is incorporated herein by reference. As is shown in FIG. 5, the user has placed his mouse arrow 49 over the sales agent button 43, and an explanatory bubble 50 has appeared nearby, indicating the function of the sales agent button 43.

In another embodiment, the sales agent is called directly from the user's client computer, and packetized voice communications are established through a data network such as the Internet. The user may obtain additional information regarding the product featured in the advertisement, or may make a purchase from the sales agent.

Figure 7:
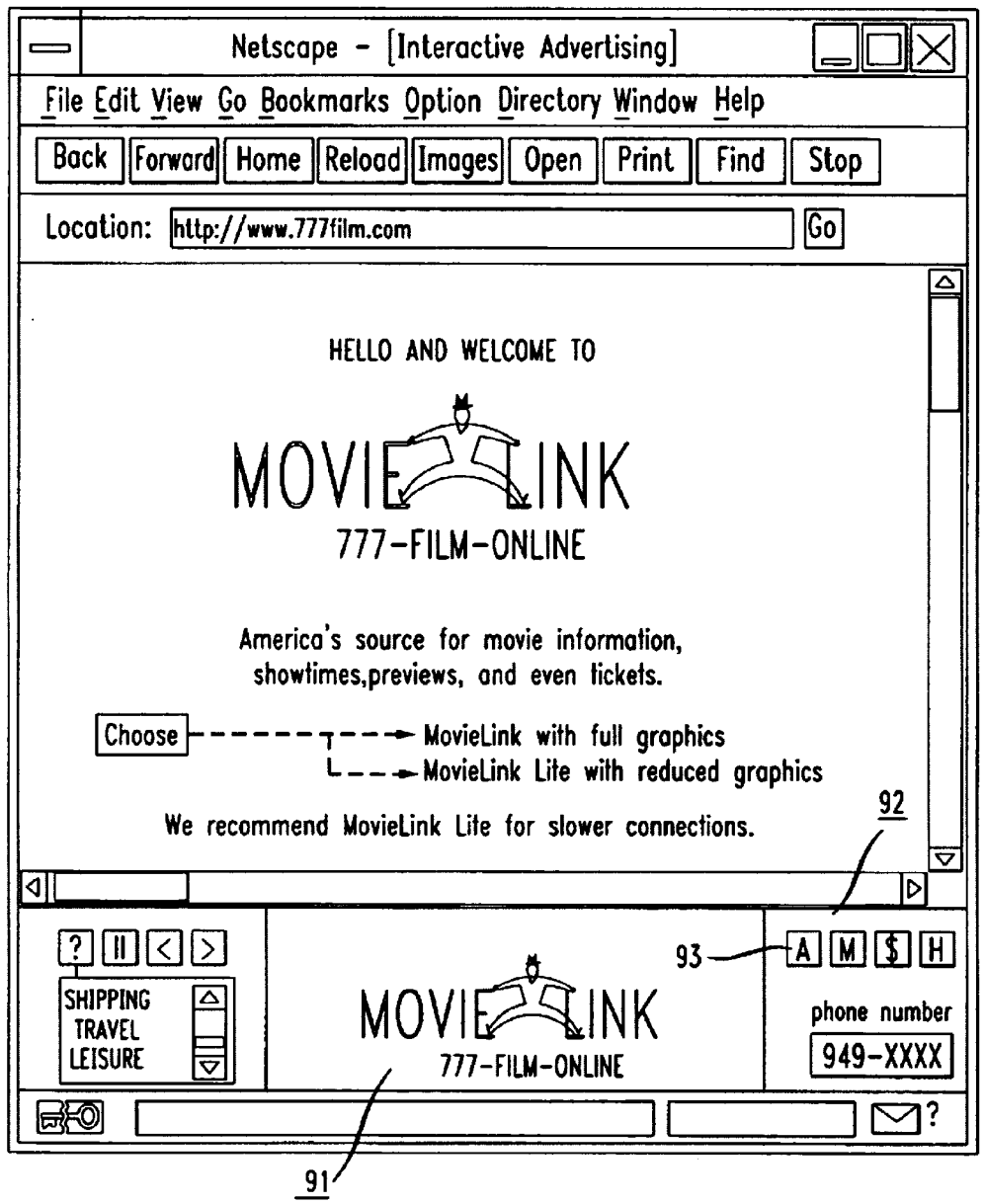
FIG. 7 shows yet another graphic user interface in accordance with an embodiment of the present invention.
Figure 8:
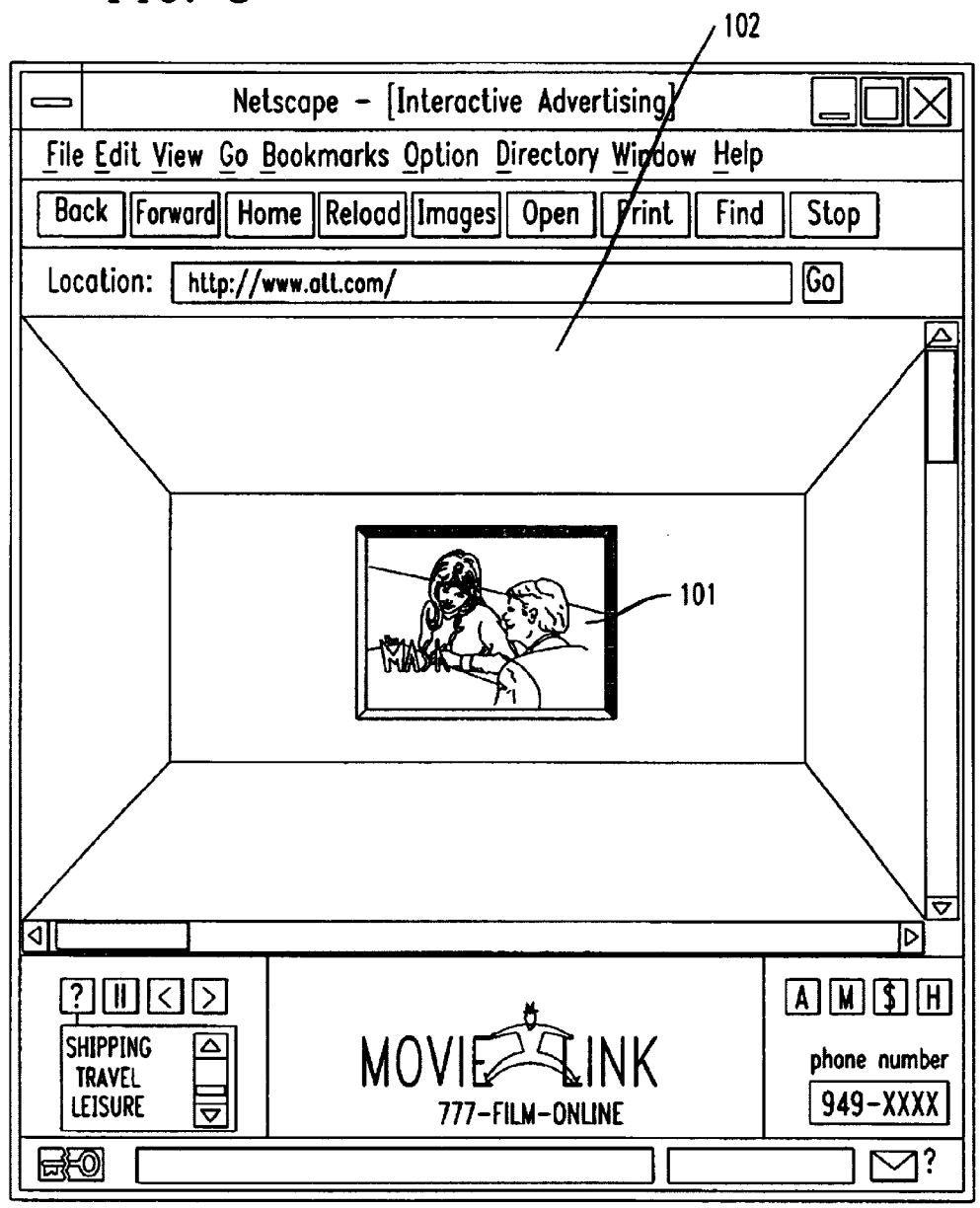
FIG. 8 shows a graphical user interface demonstrating the use of a media clip button in accordance with the present invention.

The media clip button 44 generates a multimedia display shown in the browser area, when selected. In an embodiment shown in FIG. 7, an advertisement 91 for movie information is shown in the advertising area 92. While it is displayed, the multimedia clip button 93 is selected by a user. As shown in FIG. 8, a video clip 101 of a scene from the movie is shown to the user in the browser area 102, accompanied by audio of the actors' voices. In another embodiment, a promotional video clip for the movie is shown to the user in the browser area 102, accompanied by audio narration. The data for the multimedia clip is streamed from a server to the client computer on demand from the client computer.

The secure purchase button 45 provides the capability to effectuate a secure purchase transaction by the user. When a user selects the secure purchase button 45, a secure purchase sequence is initiated for the product or service shown in the presently displayed advertisement. A secure purchase sequence comprises at least one screen displayed to the user in the browser area 31. In a process known as "upselling," the present invention displays advertisements related to the item being purchased by the user during the secure purchase sequence. For example, if the user is purchasing a pair of shoes, advertisements for belts, shoe polish and foot care products are displayed to the user in the advertising area 32 while the secure purchase sequence pages are displayed to the user in the browser area.

Figure 9:
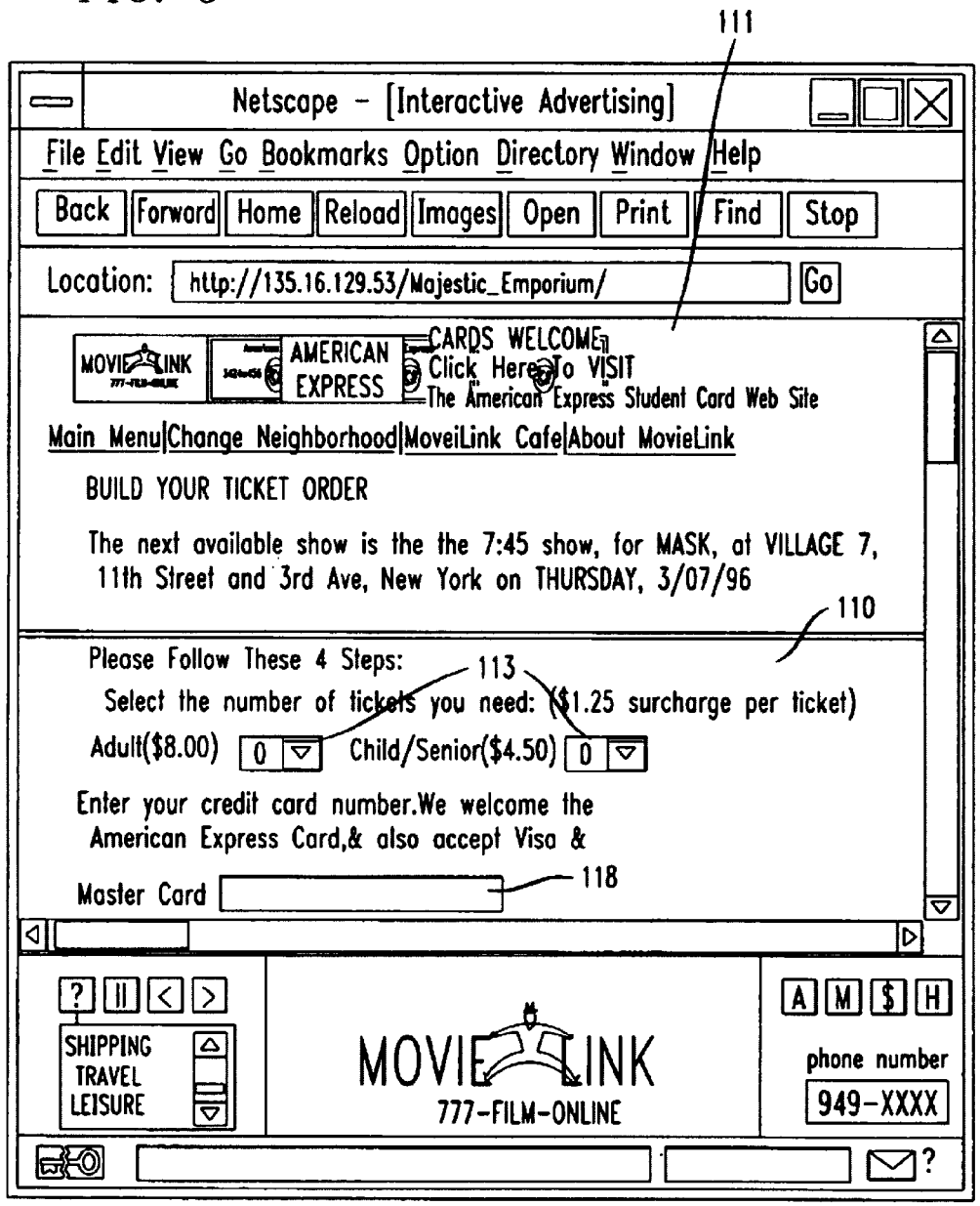
FIG. 9 shows a graphical user interface demonstrating the use of an order form in accordance with the present invention.

In an embodiment shown in FIG. 9, the present invention presents the user with a form 110 in the browser area 111 by which the user provides secure purchase information such as credit card number 112 and number of items to be purchased 113 to the advertiser. The contents of the form are forwarded to the advertiser using in a secure fashion. Numerous techniques for transmitting such data via secure means are known in the art. These techniques protect the confidentiality and integrity of the transmitted data, and generally provide means for authenticating the sender of the data. The advertiser then debits the user's credit card and ships the selected product.

In another embodiment, the user has pre-registered secure purchase information with the advertising service of the present invention. This information includes the user's name, shipping address, credit card number, credit card expiration date, and authentication password. When the user selects the secure purchase button 45 (FIG. 5), he is prompted to enter his password through a form shown in the browser area 31. If the password is correct, a secure purchase order indicating the product and the user secure purchase information is forwarded to the advertiser, which debits the user's credit card and ships the product to the user.

In one embodiment, when a user selects the home page button 46, an advertising service home page is displayed in the browser area 31. In another embodiment, when a user selects the home page button 46, the home page of the advertiser sponsoring the advertisement presently displayed in the advertising area 32 is shown to the user in the browser area 31.

Figure 10:
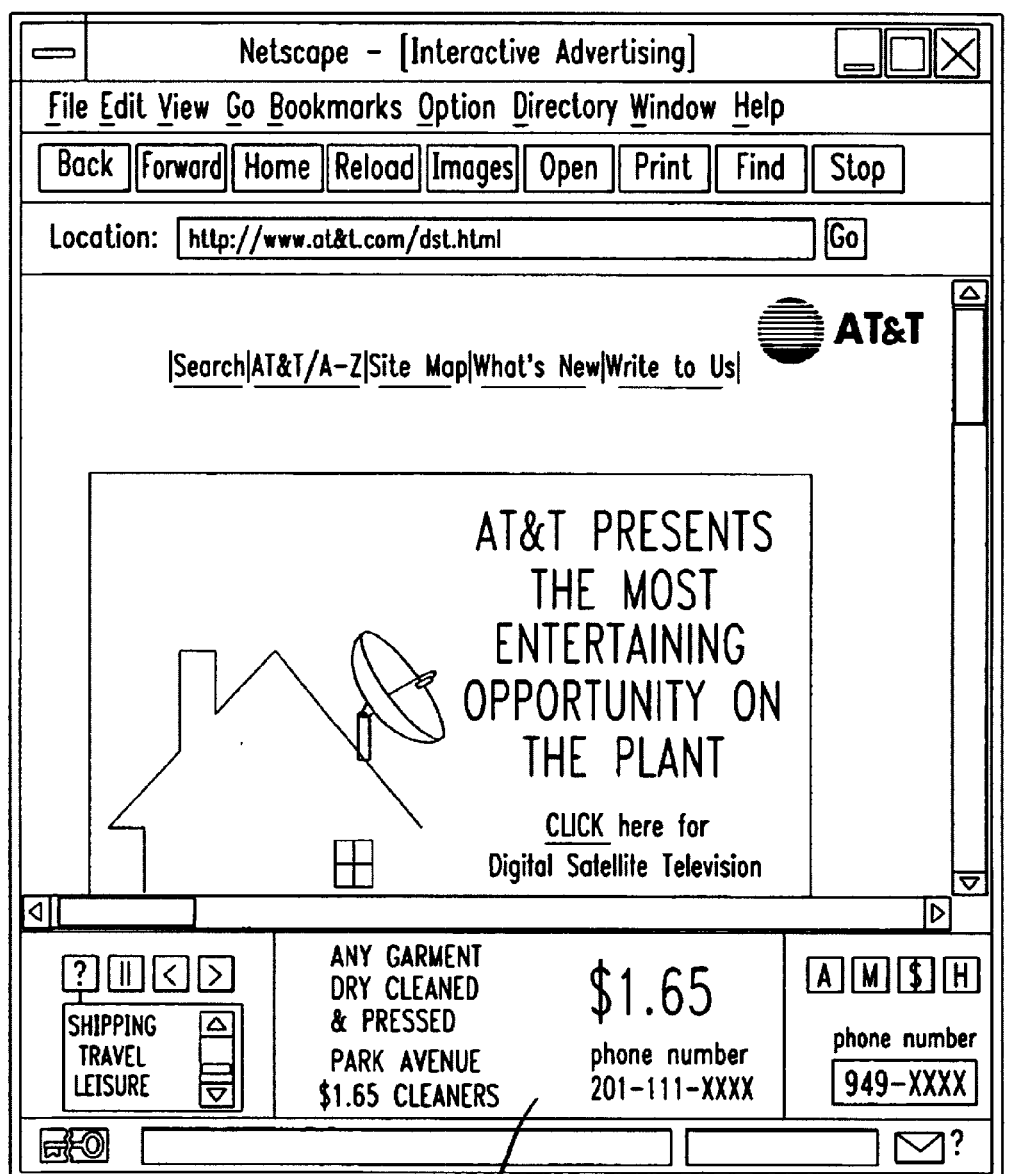
FIG. 10 shows a graphical user interface demonstrating the use of an electronic coupon in accordance with the present invention.

In accordance with the present invention, an electronic coupon may be selected, stored, and redeemed at a user's request. In an embodiment shown in FIG. 10, an electronic coupon 121 appears in the advertising area that is electronically "clipped" and stored when selected by a user.

In another embodiment, an advertisement appearing in the advertising area 37 (FIG. 5) states that an electronic coupon for the secure purchase of a product may be stored (or "clipped") by selecting the electronic coupon button 48. When the electronic coupon button 48 is selected by a user, an electronic coupon is stored in a file on the user's client computer.

Figure 11:
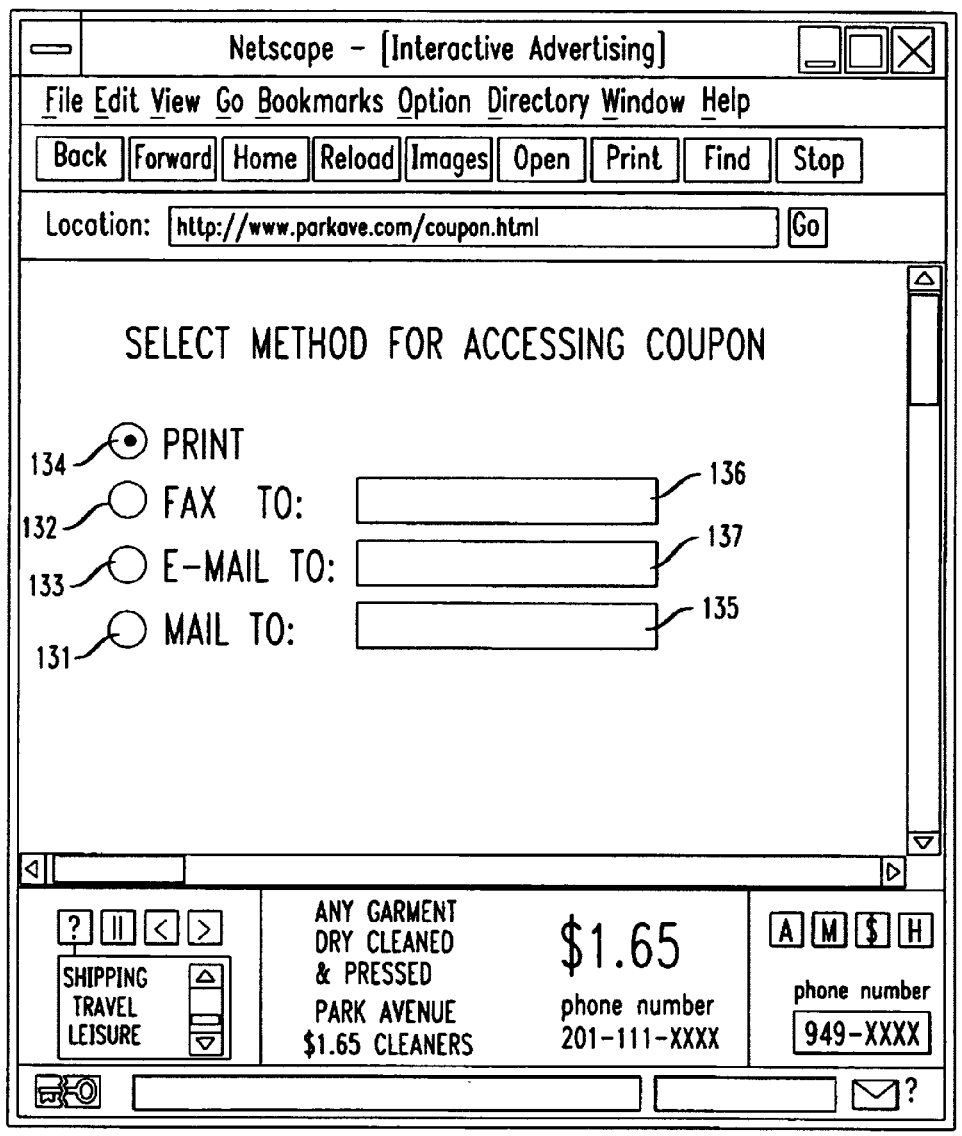
FIG. 11 shows a graphical user interface demonstrating the use of a coupon in accordance with the present invention.

The present invention may also be used to distribute conventional coupons more conventionally. In an embodiment shown in FIG. 11, when the electronic coupon button 48 (FIG. 5) is selected by a user, the user is presented with the option of choosing whether the coupon be sent to him via the postal service 131, facsimile 132, or e-mail 133, or else printed locally to the user on the user's printer 134. If the user selects the postal service option 131, the user is prompted to enter his mailing address 135, and a printed version of the coupon is sent to the user through the mail. If the user selects the facsimile option 132, the user is prompted to enter his facsimile telephone number 136, and copy of the coupon is transmitted to the user via facsimile. If the user selects the e-mail option 133, the user is prompted for his e-mail address 137, and a copy of the coupon is transmitted to the user via e-mail. If the user selects the print option, a copy of the coupon is printed on the user's printer.

The electronic coupon comprises data such as the item to which it pertains, and the economic value of the coupon. In one embodiment, the electronic coupon is redeemable for a fixed monetary discount on an item by which the purchase price is reduced when the secure purchase transaction is effectuated over the network. This is carried out electronically, as the present invention searches the client computer for electronic coupon files for pertinent electronic coupons during a secure purchase transaction. In another embodiment, the electronic coupon is redeemable for a percentage discount on an item.

The control area 36 (FIG. 5) also comprises a content control window 47 that provides the capability of personalizing the advertisements that appear in the display area 37. The content control window 47 includes a list of topics. In one embodiment, these topics include shopping, travel, and leisure. When one or more topics are selected by a user, they are highlighted, and advertisements pertinent to the highlighted topics appear in the display area. When a selected, highlighted topic is again selected by a user, it is deselected, and advertisements pertaining to the deselected topic are no longer targeted for display to the user. In this way, the topic selection process acts as a toggle.

In one embodiment, advertisements outside the highlighted topics are interspersed with advertisements within the highlighted topics and shown in the display area 37.

The present invention advantageously provides the capability of selecting advertisements to show to the user based upon the content of the pages viewed by the user in the browser area. In one embodiment, if the user browses a page regarding the State of Hawaii, the server streams an advertisement regarding travel and leisure activities in Hawaii to the user's client computer. In another embodiment, if the user browses several pages regarding mutual funds, the server streams an advertisement regarding a mutual fund to the user's client computer.

In one embodiment, the present invention carries out this content-sensitive advertising by conducting a keyword search of a page requested to be displayed on the client computer by the user. Keywords are obtained by noting words that appear between TITLE headers in HTML documents. For example, a page that contains the code: <TITLE>Bill's Favorite Surfing Spots on Molokai</TITLE> the keywords "surfing" and "Molokai" would be extracted as keywords.

After extracting the keywords, the keywords are compared to a database index, which cross-references keywords with topic names. Thus, in the present example, the keyword "surfing" matches topics "outdoor adventure" and "water sports." "Molokai" matches the topic "Hawaii."

Each topic in the database is correlated with a series of URLs for advertisements that relate to the topic. Thus, the topic "Hawaii" corresponds advertisements for the "Airline Deals to Hawaii by TravelNow" and "Luau Hawaiian Hotels," which are now streamed to the user and displayed in the advertising area 37. In this way, the user's viewing habits are used to effectively target advertisements to the user that are pertinent to the user's interests.

Advertisements may be targeted in accordance with the present invention based upon a user profile. In one embodiment, the user profile is provided by the user. who completes the entries of a form displayed in the browser area 31. The form comprises entries for the user's name, address, e-mail address, age, income level, hobbies and the like, and a submit button which transmits the completed form to the advertising service when selected by the user. Advertisements are targeted to the user based upon the information provided in the form according to methods known in the art.

Advertisements may also be targeted to a user in accordance with the present invention based upon an audit trail of the user's clipped electronic coupons. In one embodiment, a file is maintained comprising the name of a user, a list of electronic coupons clipped by that user, and the date on which each electronic coupon is clipped, and whether or not each coupon has been redeemed. This information is used to target advertisements to the user based upon collateral products that cooperate with or complement the items for which the user has selected electronic coupons. For example, if the user has selected electronic coupons for a food processor, a cutlery set, and a refrigerator, advertisements for a blender, barbecue utensils, and a stove would be displayed to the user.

Advertisements may also be targeted to the user in accordance with the present invention using an audit trail of purchases made by the user. In one embodiment, a list of items purchased is stored in a file comprising the name of the user, the items purchased, information about the items (such as price), and the date each item was purchased. Advertisements for related and complementary products to those purchased would be displayed to the user.

Advertisements may also be targeted to a user using an audit trail of advertisements selected by a user. In one embodiment, a list of advertisements selected by a user is stored in a file comprising the name of the user, advertisements selected, and the date each advertisement was selected. Advertisements for related and complementary products are displayed to the user.

The present invention is thus capable of targeting advertisements to the user in a variety of ways. Although an embodiment of the present invention may require a user to register with the advertising service and provide a user profile to receive advertisements, such user registration is not a requirement per se of the present invention. On the contrary, numerous other embodiments, including those mentioned above wherein advertisements are targeted using audit trails of clipped coupons, selected advertisements, user purchases and the like, can be implemented in ways that provide advertisements to a user without requiring the user to register with the advertising service.

The present invention advantageously provides a superior method for charging an advertiser for an advertisement displayed to users through the advertising service. Whereas known static advertising systems charge the advertiser based upon the number of times the advertisement is seen by users and/or the space taken up on the screen by the advertisement, the present invention allows the advertiser to specify a predetermined amount of time for which an advertisement is shown to a user. The cost of the advertisement increases as the amount of time for which the advertisement is displayed to the user increases.

The present invention advantageously provides a system and method for providing interactive, targeted, multimedia advertisements and electronic purchasing opportunities to a user on a hypertext network without impairing the user's regular access to that network. In accordance with the present invention, the presentation and content of the advertisements may be controlled by the user, electronic coupons are provided to the user, and the advertisements selected for transmission to the user are based upon the user's interests as revealed by the content of pages selected by the user on the hypertext network. The system and method of the present invention thus provide a more efficient, targeted, and meaningful way to provide advertisements and conduct electronic commerce on a hypertext network.

What is claimed is:

1. A system for providing to a user advertising on a hypertext network, comprising:
   a. a server having advertisements, said server connected to the network;
   b. a client computer comprising advertising software, a display device, a storage device, an input device and a browser, said client computer connected to the network, said advertising software controlling the presentation of a first set of information to the user in a first region of said display device, said browser controlling a presentation of a second set of information to the user in a second region of said display device, said advertising software adapted to receive an advertisement selected based on an analysis of the content of at least one page displayed to a user by said browser in said second region of said display device, said advertising software adapted to include said advertisement in said first set of information presented to the user in said first region of said display device, and said advertising software and said browser adapted to function independently of each other on said client computer by displaying information in different regions of said display device, wherein an advertisement displayed to the user by said advertising software in said first region of said display device comprises at least one link that loads and displays a page in said second region of said display device by said browser when said link is selected by a user.

2. The system of claim 1, wherein a media clip related to the advertisement presently displayed by the advertising software to the user is shown on said client computer when said media clip is requested by the user.

3. The system of claim 1, wherein a secure purchase transaction is effectuated through said client computer at the user's request.

4. The system of claim 1, further comprising a communications button for establishing communications between the user and a sales agent, said communications button displayed by the advertising software to the user, and wherein communications are established between the sales agent and the user at the user's request when the user selects the communications button.

5. The system of claim 1, further comprising means for the user to select advertising topics, wherein advertisements pertaining to said selected advertising topics are displayed to the user by the advertising software.

6. The system of claim 1, further comprising a help page on said server, said help page displayed to the user by said browser when the user selects a help button displayed to the user by said advertising software.

7. The system of claim 1, further comprising an advertisement service home page on said server, said home page displayed to a user at the user's request.

8. The system of claim 1, further comprising an electronic coupon that may be selected by a user, wherein said electronic coupon is stored on said client computer and redeemed by the user during a secure purchase transaction.

9. The system of claim 1, further comprising means for displaying a previously displayed advertisement at the user's request.

10. The system of claim 1, wherein a sequence of advertisements is displayed to the user, and further comprising means to pause the display of the advertisements in the sequence at the user's request.

11. A system for providing advertising to a user on a hypertext network, comprising:
 a. a server storing advertisements, said server connected to the network;
 b. a client computer having a display device, a browser and advertising software, said advertising software operating indpendently of said browser, said client computer connected to the network, said advertising software adapted to receive and display said advertisements in sequence from said server, said advertising software presenting on a region of the display device to the user an advertising area comprising:
  i. a control area having a pause button, a step back button, and a step forward button by which the presentation of advertisements to the user is controlled by a user;
  ii. a display area where advertisements are displayed in sequence to the user; and
  iii. a transaction area having a secure purchase button for effectuating a secure purchase transaction at the user's request;
 wherein an advertisement displayed by said advertising software in said advertising area comprises at least one link that loads and displays a page in a browser area when said link is selected by the user; and
 wherein said server targets said advertisements to the user, said server selecting advertisements based on an analysis of the content of pages displayed through said browser in said browser area on said client's computer at the user's request.

12. The system of claim 11, further comprising a communications button for establishing communications with a sales agent at the user's request.

13. The system of claim 11, further comprising a help page on said server, and said advertisement area further comprising a help button wherein said help page is displayed in said browser area when said help button is selected by the user.

14. The system of claim 11, further comprising multimedia information on said server, wherein said advertising area further comprises a multimedia button, and wherein said multimedia information is displayed in said browser area when said multimedia button is selected by the user.

15. The system of claim 11, further comprising a home page on said server, and wherein said advertising area further comprises a home page button, and wherein said home page is displayed in said browser area when said home page button is selected by the user.

16. The system of claim 11, wherein said advertising area further comprises an advertising topic list, and wherein said advertisements pertaining to topics selected by the user are displayed in said advertising display area.

17. The system of claim 11, wherein an advertisement is stored on said client computer as an electronic coupon when selected by the user, said electronic coupon redeemable during a secure purchase transaction.

18. A method for providing advertising to a user on a hypertext network, comprising the steps of:
 a. loading advertising software from a server on a client computer with a a browser at the user's request, said advertising software dividing the client computer screen into a browser area and an advertising area;
 b. analyzing the content of pages viewed through said browser in said browser at a user's request in order to determine the topics of said pages;
 c. selecting advertisements related to said topics;
 d. transmitting said advertisements related to said topics to said client computer from said server;
 e. displaying said advertisements to the user in said advertising area while maintaining functionality of the browser area; and
 f. displaying an advertisement page in the browser area when the advertisement shown in the advertising area is selected by a user.

19. The method of claim 18, further comprising the step of pausing the display of advertisements at the request of the user.

20. The method of claim 18, further comprising the steps of caching a predetermined number of advertisements on the client computer, pausing the display of the sequence of advertisements and stepping backward and forward through and displaying said cached advertisements to the user at the user's request.

21. The method of claim 18, further comprising the step of immediately displaying the next advertisement in said advertisement area at the user's request.

22. The method of claim 18, further comprising the step of effectuating a secure purchase of an item shown in the presently displayed advertisement at the user's request.

23. The method of claim 18, further comprising the step of establishing communications between the user and a sales agent representing the sponsor of the presently displayed advertisement at the user's request.

24. The method of claim 18, further comprising the step of showing to the user multimedia information pertaining to the presently displayed advertisement at the user's request.

25. The method of claim 18, further comprising the step of showing an advertising service home page to the user at the user's request.

26. The method of claim 18, further comprising the step of showing an advertising service help page to the user at the user's request.

27. The method of claim 18, further comprising the steps of displaying a list of advertising topics to a user and displaying advertisements in said advertisement area pertaining to said advertising topics selected by the user.

28. The method of claim 18, further comprising the steps of storing an electronic coupon when selected by a user, and redeeming said electronic coupon during a secure purchase transaction at the request of a user.

29. A method of effectuating a secure purchase transaction on a hypertext network, comprising the steps of:
   a. loading advertising software from a server on a client computer with a browser at a user's request, said advertising software dividing the client computer screen into a browser area and an advertising area;
   b. analyzing the content of pages viewed through said browser in said browser area on said client computer at the user's request in order to determine the topics of said pages;
   c. selecting advertisements related to said topics;
   d. transmitting said advertisements to the user in said advertising area while maintaining the original functionality of the browser in the browser area;
   e. displaying said advertisements to the user in said advertisement area while maintaining the original functionality of the browser in the browser area;
   f. displaying an advertisement page in the browser area when the advertisement shown in the advertising area is selected by a user;
   g. accepting a secure a purchase request from a user for an item offered in a presently displayed advertisement; and
   h. accepting purchaser information from the user.

30. The method of claim 29, wherein said secure purchase information comprises the credit card information, said credit card information comprising the name of the credit card vendor, the user's name and credit card number, and the expiration date of the user's credit card.

31. A method of effectuating a secure purchase transaction on a hypertext network, comprising the steps of:
   a. loading advertising software from a server on a client computer with a browser at a user's request, said advertising software dividing the client computer screen into a browser area and an advertising area;
   b. analyzing the content of pages viewed through said browser in said browser area on said client computer at the user's request in order to determine the topics of said pages;
   c. selecting advertisements related to said topics;
   d. transmitting said advertisements to the user in said advertising area while maintaining functionality of the browser in the browser area;
   e. displaying said advertisements to the user in said advertising area while maintaining functionality of the browser in the browser area;
   f. displaying an advertisement page in the browser area when the advertisement shown in the advertising area is selected by a user;
   g. accepting a secure purchase request from a user for an item offered in a presently displayed advertisements;
   h. accepting a confidential authentication password from the user; and
   i. forwarding preregistered purchaser information to a sponsor of said presently displayed advertisement if the confidential authentication password provided by the user matches a confidential authentication password stored on said server, and generating an error message if said password provided by the user does not match said password stored on said server.

32. The method of claim 31, further comprising the steps of storing an electronic coupon when said advertisement is selected by a user, and redeeming said electronic coupon during a secure purchase transaction at the request of a user.

33. A client computer for presenting advertising to a user, comprising:
   a. a microprocessor;
   b. a memory that stores browser software adapted to be executed to retrieve and display in a browser area a hypertext page from a site and advertising software adapted to retrieve and display in an advertising area targeted advertisement from an advertising server which selects advertisements based on an analysis of the content of pages viewed through said browser software in said browser area, said advertising software further adapted to be executed by said microprocessor to display a step forward button and a step back button to the user, such that when the step forward button is selected by the user, a next advertisement in a sequence of advertisements from the advertising server is displayed to the user independently from the page that is displayed to the user, a previous advertisement in the sequence of advertisement form the advertising server is displayed to the user independently from the page that is displayed to the user by the browser; wherein said browser software and advertising software is further adapted to display an advertisement displayed by said advertising software in said advertising area is selected by the user; and
   c. a display device on which to display the hypertext page and the advertisement to the user.

34. The client computer of claim 33, wherein said advertising software is adapted to be executed by said microprocessor to display an advertisement that is part of a stream of advertisements.

35. The client computer of claim 33, wherein said advertising software is adapted to be executed by said microprocessor to display a sales agent button to the user, such that when said sales agent button is selected by the user, interactive communications are established between the user and a sales agent of the sponsor of an advertisement displayed to the user.

36. The client computer of claim 33, wherein said advertising software is adapted to be executed by said microprocessor to display a list of topics to the user, such that when the user selects a topic form the list of topics, advertisements pertaining to that topic are received from the advertising server.

37. The cliet computer of claim 33, wherein said advertising software is adapted to be executed by said microprocessor to display a pause button to the user, such that when said pause button is selected a first time by the user, the display of advertisements in a sequence of advertisements in a sequence of advertisements is paused on the advertisment that is displayed to the user at the time the pause button is selected, and wherein when the pause button is selected a second time by the user, the display of advertisements in the sequence of advertisements in resumed.

38. The client computer of claim 33, wherein advertisements are streamed from the advertising server to said client computer.

39. The client computer of claim 33, wherein said advertising software is adapted to be executed by said microprocessor to display a step forward button a media clip button, such that when said media clips is selected, multimedia information is shown to the user that is related to the advertisement that is shown to the user at the time the user selects the multimedia button.

40. The client computer of claim 33, wherein said advertising software is adapted to be executed by said microprocessor to display a secure purchase button, such that when said secure purchase button is selected by the user, the user is presented with a graphical user interface through which the user purchases a product related to the advertisement displayed to the user at the time the user selects the secure purchase button.

41. The client computer of claim 33, wherein the graphical user interface through which the user purchases a product is displayed to the user by the browser software.

42. The client computer of claim 33, wherein the graphical user interface through which the user purchases a product is displayed to the user by the advertising software.

43. The client computer of claim 33, wherein said advertising software is adapted to be executed by said microprocessor to display an electronic coupon button, such that when said electronic coupon button is selected by the user, an electronic coupon is stored at the client computer for a product related to the advertisement displayed to the user at the time the user selects the electronic coupon button.

44. The client computer of claim 33, wherein said advertising software is adapted to be executed by said microprocessor to display a home page button, such that when said home page button is selected by the user, a page is displayed to the user by the browser software, wherein the page includes information pertaining to the sponsor of the advertisement that was displayed to the user at the time the user selected the home page button.

* * * * *